US012500484B2

(12) United States Patent
Alvi et al.

(10) Patent No.: US 12,500,484 B2
(45) Date of Patent: *Dec. 16, 2025

(54) INTEGRATED COMMON MODE CHOKE AND CURRENT SENSING

(71) Applicant: GM Global Technology Operations LLC, Detroit, MI (US)

(72) Inventors: Muhammad Hussain Alvi, Troy, MI (US); Yilun Luo, Ann Arbor, MI (US); Minh-Khai Nguyen, Troy, MI (US); Alireza Fatemi, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 270 days.

This patent is subject to a terminal disclaimer.

(21) Appl. No.: 18/304,614

(22) Filed: Apr. 21, 2023

(65) Prior Publication Data

US 2024/0356413 A1 Oct. 24, 2024

(51) Int. Cl.
*H02P 1/34* (2006.01)
*H02K 11/028* (2016.01)
*H02K 11/27* (2016.01)
*H02K 11/33* (2016.01)

(52) U.S. Cl.
CPC ........ *H02K 11/028* (2013.01); *H02K 11/27* (2016.01); *H02K 11/33* (2016.01)

(58) Field of Classification Search
CPC ...... H02P 27/06; H02P 29/027; H02P 29/032; H02K 11/33
See application file for complete search history.

(56) References Cited

U.S. PATENT DOCUMENTS 12,132,428 B2 * 10/2024 Fatemi ............... H02K 11/0141

FOREIGN PATENT DOCUMENTS

CN 118826391 A * 10/2024 ........... H02K 11/028

* cited by examiner

*Primary Examiner* — Karen Masih
(74) *Attorney, Agent, or Firm* — CANTOR COLBURN LLP (57) ABSTRACT

An alternating current (AC) motor system includes an AC motor with a rotor and a stator with multi-phase AC stator windings. The system also includes a power inverter that generates a multi-phase AC voltage, an AC bus that connects the power inverter to the stator windings, an AC choke that surrounds the AC bus, and a current sensor with a coil wound on or surrounded by the AC choke. The current sensor measures common mode current in the AC bus, and is used in pulse width modulation or slew rate control of the power inverter, ensuring smooth operation and reducing the risk of damage due to common mode current.

20 Claims, 6 Drawing Sheets

INTEGRATED COMMON MODE CHOKE AND CURRENT SENSING

INTRODUCTION

Multi-phase alternating current (AC) machines are known to exhibit substantial induced currents within the machine structures attributed to common mode voltages in the phase conductors. Induced currents within the machine structures may be undesirable and are therefore desirably reduced or eliminated.

Common mode current may be measurable directly through cored current sensors or current transformer measurements which involves using current transformers to measure the current flowing through each of the phase conductors. The common mode current may be calculated by adding up the currents measured in each of the three phases. Common mode current techniques may suffer from limited frequency response, saturation, non-linearity and interference, for example cross-coupling due to compact placement of the phase conductors. Moreover, such techniques come with undesirable mass and volumetric and packaging penalties particularly with highly integrated systems as may be practiced in automotive applications.

It is generally desirable to minimize the overall length of the AC bus and to minimize overall system mass. AC buses may be configured with various sub-sections making up the overall bus length. Thus, each sub-section of a bus is desirably minimized in length. Current sensors require some finite packaging volume including some finite length of some portion of the bus conductors. Current sensing cores for transformers or isolation of proximity sensors may contribute mass and require packaging dimensions, including length of the buses. It may be desirable to measure and reduce common mode current in a multi-phase motor system to improve performance and system longevity and for purposes related to conditional monitoring, diagnostics and control. Preferably, these objectives are met without increasing system mass or packaging dimensions, including length of the buses.

SUMMARY

In one exemplary embodiment, an alternating current (AC) motor system may include an AC motor including a rotor and a stator having multi-phase AC stator windings, a power inverter producing a multi-phase AC voltage, an AC bus coupled between the power inverter and the multi-phase AC stator windings, an AC choke surrounding the AC bus, and a current sensor including a coil proximate the AC choke.

In addition to one or more of the features described herein, the coil proximate the AC choke may be wound around the AC choke.

In addition to one or more of the features described herein, the coil proximate the AC choke is within the AC choke.

In addition to one or more of the features described herein, the current sensor may include a shunt resistor across the coil to provide a measurable voltage across the shunt resistor used in determining a current through the shunt resistor.

In addition to one or more of the features described herein, the current sensor may include a voltage integrator used to integrate an open circuit voltage across the coil.

In addition to one or more of the features described herein, the current sensor may include a shunt resistor selectively couplable across the coil to provide a measurable voltage across the shunt resistor when coupled across the coil and otherwise to provide a measurable open circuit voltage across the coil when not coupled across the coil.

In addition to one or more of the features described herein, the current sensor may include a shunt resistor across the coil to provide a measurable voltage across the shunt resistor used in determining a current through the shunt resistor.

In addition to one or more of the features described herein, the current sensor may include a voltage integrator used to integrate an open circuit voltage across the coil.

In addition to one or more of the features described herein, the current sensor may include a shunt resistor selectively couplable across the coil to provide a measurable voltage across the shunt resistor when coupled across the coil and otherwise to provide a measurable open circuit voltage across the coil when not coupled across the coil.

In addition to one or more of the features described herein, the coil may include a single turn.

In addition to one or more of the features described herein, the AC choke may have an effective bandwidth at least covering resonant frequencies of a capacitance between the AC stator windings and the stator or a frame of the AC motor.

In another exemplary embodiment, a method of controlling an alternating current (AC) motor system may include attenuating a common mode current through an AC bus with an AC choke surrounding the AC bus, the AC bus providing multi-phase AC current from a power inverter to multi-phase AC stator windings in a stator, determining the common mode current based upon a voltage from a coil proximate the AC choke, and adjusting one of a slew rate and a pulse width modulation of the power inverter based upon the determined common mode current.

In addition to one or more of the features described herein, the coil may be wound around the AC choke.

In addition to one or more of the features described herein, the coil may be within the AC choke.

In addition to one or more of the features described herein, the AC choke may include an effective bandwidth at least covering resonant frequencies of a capacitance between the multi-phase AC stator windings and the stator or a frame of the AC motor.

In yet another exemplary embodiment, an electrified powertrain, may include a battery pack, a traction power inverter module ("TPIM") connected to the battery pack, and configured to change a direct current ("DC") voltage from the battery pack to a multi-phase alternating current ("AC") voltage, a rotary electric machine energized by the multi-phase AC voltage from the TPIM over a multi-phase AC bus, and including a stator having multi-phase AC stator windings, a rotor, and a rotor shaft connected to and surrounded by the rotor and configured to rotate about an axis of rotation in conjunction with the rotor when the rotary electric machine is energized, a transmission coupled to the rotor shaft and powered by the rotary electric machine, an AC choke surrounding the multi-phase AC bus, a current sensor including a coil proximate the AC choke for determining a common mode current through the AC bus, and a controller responsive to a signal from the current sensor to adjust one of a slew rate and a pulse width modulation of the TPIM based upon the determined common mode current.

In addition to one or more of the features described herein, the AC choke may have an effective bandwidth at least covering resonant frequencies of a capacitance between the multi-phase AC stator windings and the stator or a frame of the rotary electric machine.

In addition to one or more of the features described herein, the coil proximate the AC choke may be wound around the AC choke.

In addition to one or more of the features described herein, the coil proximate the AC choke may be within the AC choke.

In addition to one or more of the features described herein, the current sensor may include a shunt resistor selectively couplable across the coil to provide a measurable voltage across the shunt resistor when coupled across the coil and otherwise to provide a measurable open circuit voltage across the coil when not coupled across the coil.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. Throughout the drawings, corresponding reference labels indicate like or corresponding parts and features. Description of parts and features in one drawing is understood to apply to parts and features in other drawings sharing the same reference labels to the extent such parts and features are not otherwise distinguishable through drawing examination by one having ordinary skill in the art or distinguished by additional written description herein.

Figure 1:
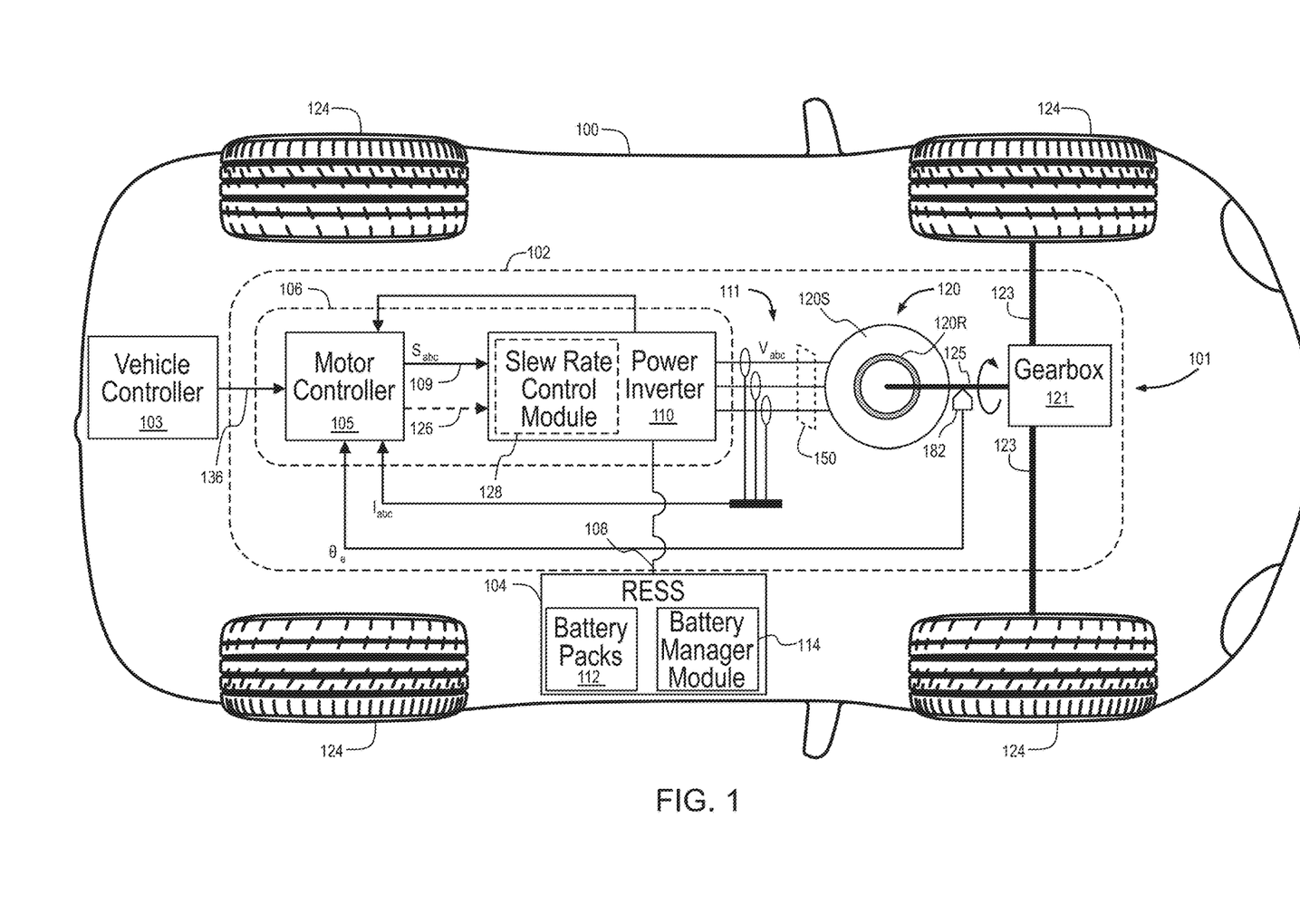
FIG. 1 illustrates an electric propulsion system on a vehicle, in accordance with one or more embodiments.

FIG. 1 schematically illustrates an embodiment of an electric propulsion system 101 on a vehicle 100. Vehicle and vehicular are understood to refer to any means of transportation including non-limiting examples of motorcycles, cars, trucks, buses, excavation, earth moving, construction and farming equipment, railed vehicles like trains and trams, and watercraft like ships and boats. The electric propulsion system 101 may include various control components, electrical systems and electro-mechanical systems including, for example, a rechargeable energy storage system (RESS) 104 and an electric drive unit (EDU) 102. The electric propulsion system 101 may be employed on a powertrain system to generate propulsion torque as a replacement for, or in conjunction with, an internal combustion engine in various electric vehicle (EV) applications and hybrid electric vehicle (HEV) applications, respectively.

The EDU 102 may be of varying complexity, componentry and integration. An exemplary highly integrated EDU 102 may include, for example, a rotary electric machine such as an alternating current (AC) motor (motor) 120 and a traction power inverter module (TPIM) 106 including a motor controller 105 and a power inverter 110. The motor 120 may include a stator 120S and a rotor 120R coupled to a rotor shaft 125 and position sensor 182, for example a variable reluctance resolver or an encoder. The position sensor 182 may signally connect directly to the motor controller 105 and is employed to monitor angular position ($\theta_e$) of the rotor of the motor 120. The angular position ($\theta_e$) of the rotor of the motor 120 is employed by the motor controller 105 to control operation of the power inverter 110 that controls torque production and other functions of the motor 120.

The rotor shaft 125 may transfer torque between the motor 120 and driveline components, some of which may be integrated within the EDU 102, for example in a gearbox 121 including reduction and differential gear sets and one or more axle outputs. The gearbox 121 may simply include reduction gearing and a prop shaft output for coupling to a differential gear set. One or more axles 123 may couple to the gearbox 121 directly or through final drive or differential gear sets if separate therefrom. Axle(s) 123 may couple to one or more vehicle wheel(s) 124 for transferring tractive force between a wheel and pavement. One having ordinary skill in the art will recognize alternative arrangements for driveline components. Propulsion torque requests or commands 136 ($T_{cmd}$) may be provided by a vehicle controller 103 to the motor controller 105 as a discrete input of over a network bus such as a CAN bus.

Any controller may include one or more control modules. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, a controller area network (CAN) bus, and in-plant and service-related networks including for over the air (OTA) software updates. Functions of a control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module may have a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

The RESS 104 may, in one embodiment, include one or more electro-chemical battery packs 112, for example high capacity, high voltage (HV) rechargeable lithium ion battery packs for providing power to the vehicle via a HV direct current (DC) bus 108. The RESS 104 may also include a battery manager module 114. The RESS 104 may include one or more battery packs 112 constructed from a plurality of battery pack modules allowing for flexibility in configurations and adaptation to application requirements. Battery packs may include a plurality of battery pack modules constructed from a plurality of cells allowing for flexibility in configurations and adaptation to application requirements. Battery pack modules may include a plurality of cells allowing for flexibility in configurations and adaptation to application requirements. For example, in vehicular uses, the RESS 104 may be modular to the extent that the number of battery pack modules may be varied to accommodate a desired energy density or range objective of a particular vehicle platform, intended use, or cost target. Battery packs and battery pack modules may be variously and selectively configured in accordance with desired propulsion architecture and charging and discharging functions. It is understood that the RESS 104 may be reconfigurable at any level of integration including battery pack, battery module and cell.

The motor 120 may be a multi-phase AC motor receiving multi-phase AC power over a multi-phase power bus (AC bus) 111 which is coupled to the power inverter 110. In one embodiment, the motor 120 is a three-phase motor and the power inverter 110 is a three-phase inverter. The power inverter 110 may include a plurality of solid-state switches in a solid-state switching section. The power inverter 110 couples to DC power over the HV DC bus 108 (DC input voltage ($V_{dc}$)) from the RESS 104, for example at 400 or 800 volts. The motor controller 105 is coupled to the power inverter 110 for control thereof. The power inverter 110 electrically connects to stator phase windings of a three-phase stator winding of the motor 120 via the AC bus 111, with electric current ($I_{abc}$) monitored on two or three phases thereof. The AC bus 111 provides conductive coupling of the multi-phase outputs of the power inverter 110 to phase terminals of the stator windings. The AC bus 111 may include AC bus features of the TPIM 106, AC bus features of the motor 120 and conductors connecting the AC bus features of the TPIM 106 and the AC bus features of the motor 120. As used herein, AC bus 111 includes all high voltage/high current phase conductors between the switching section of the power inverter 110 and the motor 120 including, for example, bus bars, cables, rods etc. The power inverter 110 may be configured with suitable control circuits including paired power transistors (e.g., IGBTs) for transforming high-voltage DC voltage on the HV DC bus 108 to high-voltage three-phase AC voltage ($V_{abc}$) on the AC bus 111 and transforming high-voltage three-phase AC voltage ($V_{abc}$) on the AC bus 111 to high-voltage DC voltage on the HV DC bus 108. The power inverter 110 may employ any suitable pulse width modulation (PWM) control, for example sinusoidal pulse width modulation (SPWM) or space vector pulse width modulation (SVPWM), as well as adaptive (APWM) and variable frequency (VFPWM) PWM variants and others to generate switching vector signals ($S_{abc}$) 109 to convert stored DC electric power originating in the battery pack 112 of the RESS 104 to AC electric power to drive the motor 120 to generate torque. Similarly, the power inverter 110 may convert mechanical power transferred to the motor 120 to DC electric power to generate electric energy that is storable in the battery pack 112 of the RESS 104, including as part of a regenerative braking control strategy. The power inverter 110 may be configured to receive the switching vector signals ($S_{abc}$) 109 from motor controller 105 and control inverter states to provide the motor drive and regeneration functionality. Switching vector signals ($S_{abc}$) 109 may also be referred to herein as conduction commands. Other control signals may be provided from and to the motor controller 105, including for example a slew rate control signal 126 to a slew rate control module 128 of the power inverter 110 for controlling the switching section of the power inverter 110.

Control of the power inverter 110 may include high frequency switching of the solid-state switches in accordance with the PWM control and slew rate control if equipped. A number of design and application considerations and limitations determine inverter switching frequency and PWM control. Inverter controls for AC motor applications may include fixed switching frequencies, for example switching frequencies around 10-30 kHz and PWM controls that minimize switching losses of the IGBTs or other power switches of the power inverter 110. Higher switching frequencies may be achievable with emerging solid-state switching technologies such as silicon carbide (SiC) MOSFETs, gallium nitride (GaN) transistors, diamond MOSFETs, carbon nano-tube transistors, and graphene-based transistors.

The disclosed improvements relate to a multi-phase AC motor 120, and may be realized in HEV and EV embodiments of the vehicle 100 without limitation, as well as in non-vehicular applications such as power plants, hoists, mobile platforms and robots, etc. The motor 120 may, for example, be an interior permanent magnet (IPM) machine, a permanent magnet synchronous reluctance (PMSR) machine, a synchronous reluctance (SR) machine, an induction machine, or any AC machine including a multi-phase AC stator 120S.

Figure 2A:
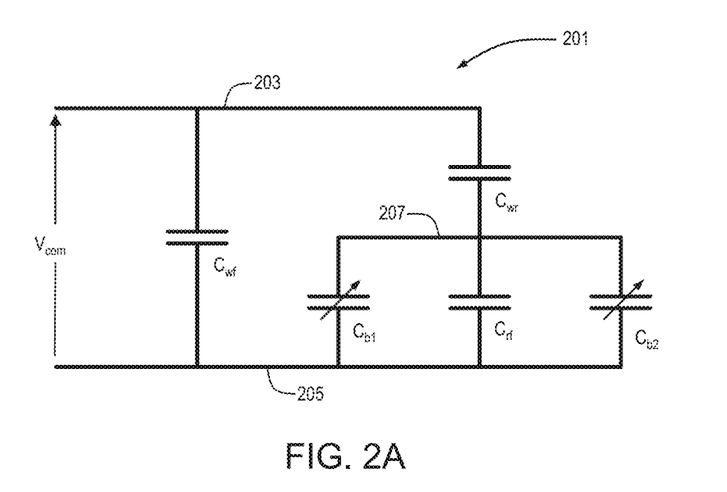
FIGS. 2A-2C illustrate models of a motor of the electric propulsion system, in accordance with one or more embodiments.
Figure 2B:
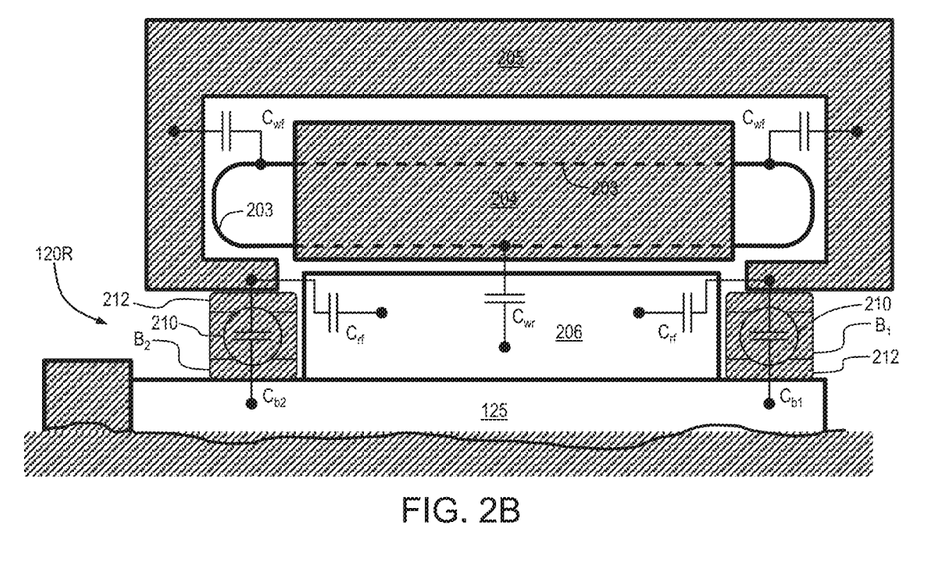
Figure 2C:
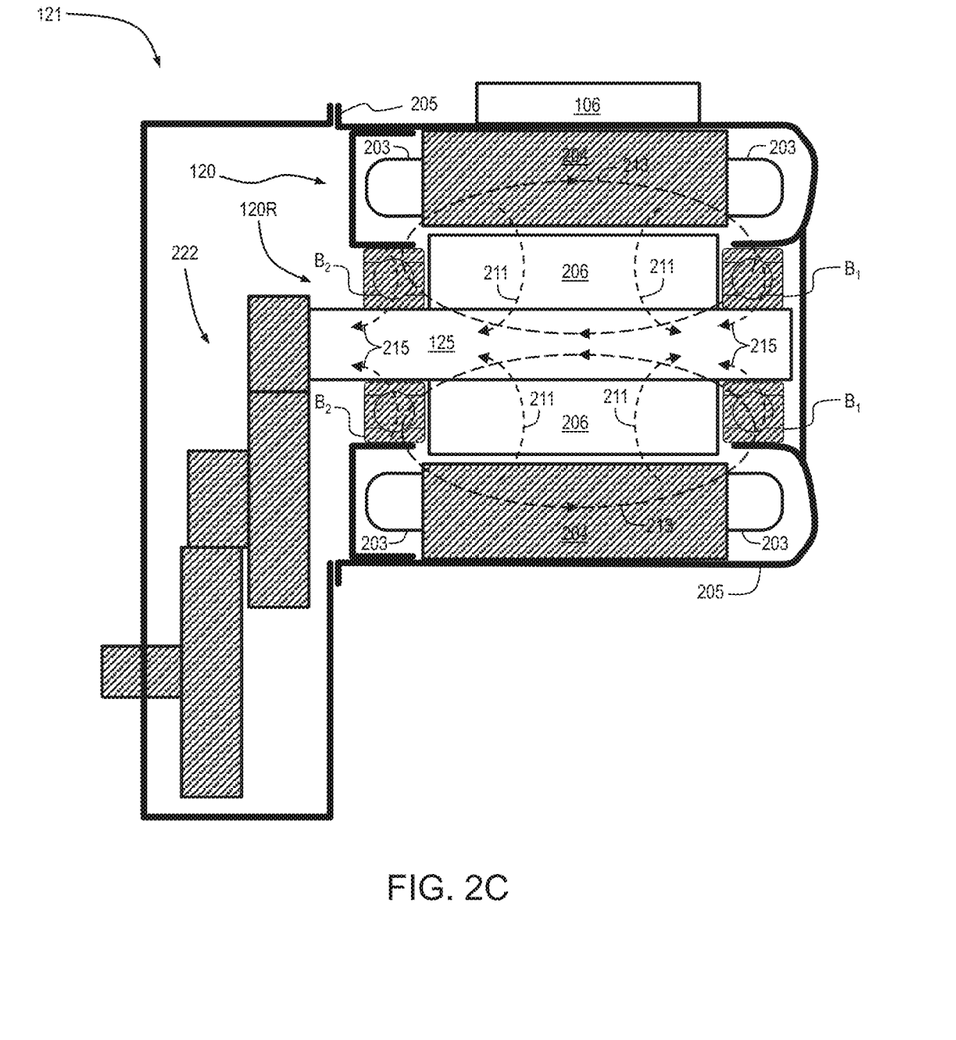

The power inverter 110 operates by synthesizing multi-phase AC voltages which are applied to corresponding phase windings of the multi-phase stator 120S of the motor 120 over the AC bus 111. In addition to the fundamental voltages output onto the AC bus 111, there may be parasitic excitations as a result of non-ideal waveforms. In a balanced three phase system, for example, the three fundamental AC voltages may be substantially sinusoidal and separated by 120 degrees. The summation of the three phase voltages would be equal to zero in an ideal system. However, the power inverter 110 operates by high frequency switching of a DC voltage to synthesize sinusoidal voltages over time. Instantaneous PWM voltages on the AC bus 111 and at the stator phase windings may appear as square waveforms whose summations may not equal zero, thus resulting in high frequency excitations within the motor 120 manifesting in common mode voltages on the stator phase windings. A simplified model of the motor 120 is illustrated in FIGS. 2A, 2B and 2C and additional reference is made to those figures. FIGS. 2A and 2B model an impedance network 201 including a plurality of inherent machine parasitic capacitances "C" among major components and excitation voltages $V_{com}$. The impedance network 201 may include a winding to frame capacitance $C_{wf}$ from the stator windings 203 in the stator core 204 to the motor frame 205, a winding to rotor capacitance $C_{wr}$ from the stator windings 203 in the stator core 204 to the rotor core 206 and the rotor shaft 125 of the rotor 120R, a rotor to frame capacitance $C_{rf}$ from the rotor core 206 and rotor shaft 125 of the rotor 120R to the motor frame 205, and bearing impedances $C_{b1}$ and $C_{b2}$ from the rotor core 206 and rotor shaft 125 of the rotor 120R to the motor frame 205 through the bearing $B_1$ and $B_2$, respectively. This impedance network 201 may be excited by the common mode voltages ($V_{com}$) appearing on the AC bus 111 due to the power inverter 110 operation. The FIGS. 2A and 2B model corresponds to motor 120 having a pair of bearings $B_1$ and $B_2$, though additional bearings may be found in other embodiments. Bearings may include rolling elements 210 and race elements 212.

Various induced currents may be present in the power inverter 110 driven AC motor 120 and are illustrated by the FIG. 2C model of a highly integrated EDU 102 including a motor 120, a TPIM 106 and a gearbox 121 with an integrated gearset 222. Capacitive currents 211 through the motor 120 may include low amplitude displacement currents through the bearing impedances $C_{b1}$ and $C_{b2}$ due to the voltage appearing on the rotor core 206 and rotor shaft 125 of the rotor 120R (between $C_{wr}$ and $C_{rf}$ in FIG. 2A). Ground currents 213 may flow between the stator windings 203 and motor frame 205 creating a circumferential flux through the motor 120 that induces a voltage across the rotor shaft 125 and results in circulating currents 213 flowing through the bearing impedances $C_{b1}$ and $C_{b2}$. As illustrated in FIG. 2C, the circulating currents may flow through the bearing $B_1$ and $B_2$ in opposite directions. Rotor ground currents 215 may flow through the bearing impedances $C_{b1}$ and $C_{b2}$ as stray currents if the impedance of the rotor 120R back to the inverter frame is lower than the stator core 204 back to the inverter frame. Such rotor ground currents 215 may not be significant in systems with short AC bus 111 cable runs, frame integrated inverters and shielded AC bus 111 cables. Electrical discharge machining (EDM) currents through the bearing $B_1$ and $B_2$ differ from the capacitive displacement currents as EDM currents are partial discharge currents within and through the bearings which may occur due to changes in the bearing impedance. Operating factors such as bearing load, speed and temperature may affect changes in the bearing impedance. Also, design factors such as sealed versus hydrodynamic effects of open, oil lubricated bearings may affect changes in the bearing impedance. Transient factors may also affect changes in the bearing impedance and may include rapid load increases, debris and vibration which may cause closing of the rolling element to race gap. Reductions in the bearing impedance may result in effective shorting of the bearings and undesirable discharge of the rotor voltage as EDM currents.

For the rotor ground currents 215 and circulating currents 213, the winding to frame capacitance $C_{wf}$ from the stator windings 203 in the stator core 204 to the motor frame 205 may be a major factor. Common mode currents, and hence the induced circulating currents 213, may be attenuated through the introduction of a filter in the form of an AC choke 150 operative upon the AC bus 111 as shown in FIG. 1. All phase conductors of the AC bus 111 are coupled to the AC choke 150 and hence the AC choke is effective upon the common mode currents. The addition of the AC choke 150 to the AC bus 111 may increase the impedance of the common mode path at select frequencies thereby attenuating the common mode currents and the downstream induced circulating currents. The AC choke may be configured around the AC bus anywhere along its path. Multiple AC chokes may be placed around the AC bus at different points.

Figure 3:
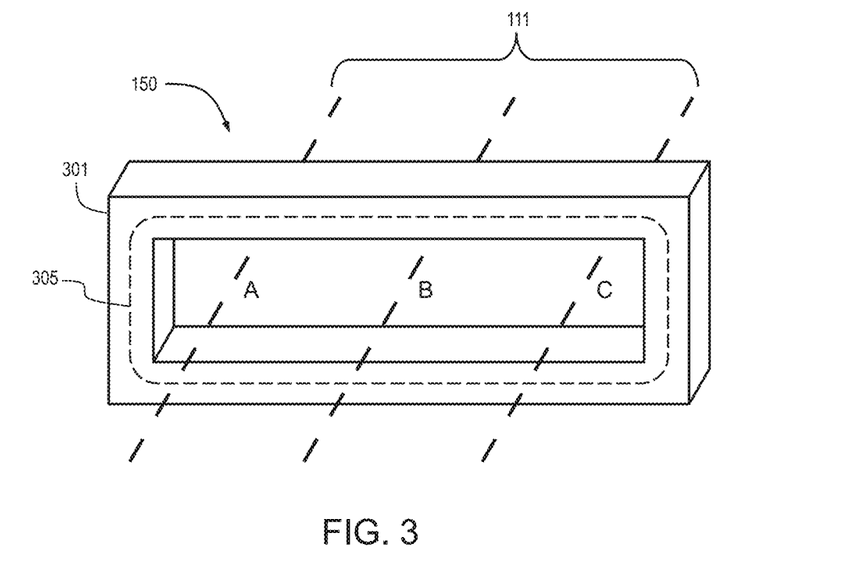
FIG. 3 illustrates an AC choke and AC bus of the electric propulsion system, in accordance with one or more embodiments.

FIG. 3 schematically illustrates an AC choke 150 surrounding phase conductors (A, B, C) of the AC bus 111 as described herein. The AC choke 150 includes a core 301. The core 301 of the AC choke 150 has a mean length for the flux path shown by the closed dashed line 305. Core 301 and choke 150 may be used interchangeably herein.

Core as used herein refers to a magnetic structure defining a looped flux path which may be closed or include air gaps. The core 301 of FIG. 3 is illustrated as closed—that is, the core has no discrete air gap. The core 301 may be referred to as a common mode core since it surrounds all three current conductors A, B and C wherein the net magnetic flux induced in the core by the primary phase currents flowing in the conductors is zero in a balanced multi-phase bus. Thus, flux generated in the core may be the result only from unbalanced parasitic currents in the conductors. For purposes of this disclosure, any core that surrounds all conductors of the AC bus is considered to be a common mode core. The core 301 may be substantially rectangular and includes a pair of opposing short sides and a pair of opposing long sides as illustrated in FIG. 3. Common mode cores may be other than rectangular, for example circular or elliptical or triangular. The shapes of the surrounded conductors as well as packaging considerations may influence the shapes and dimensions of the common mode core. The core 301 may be assembled to a dielectric case or a dielectric overmold (neither shown) which may also serve to integrate or retain other components such as coils and circuit elements discussed herein.

Figure 4:
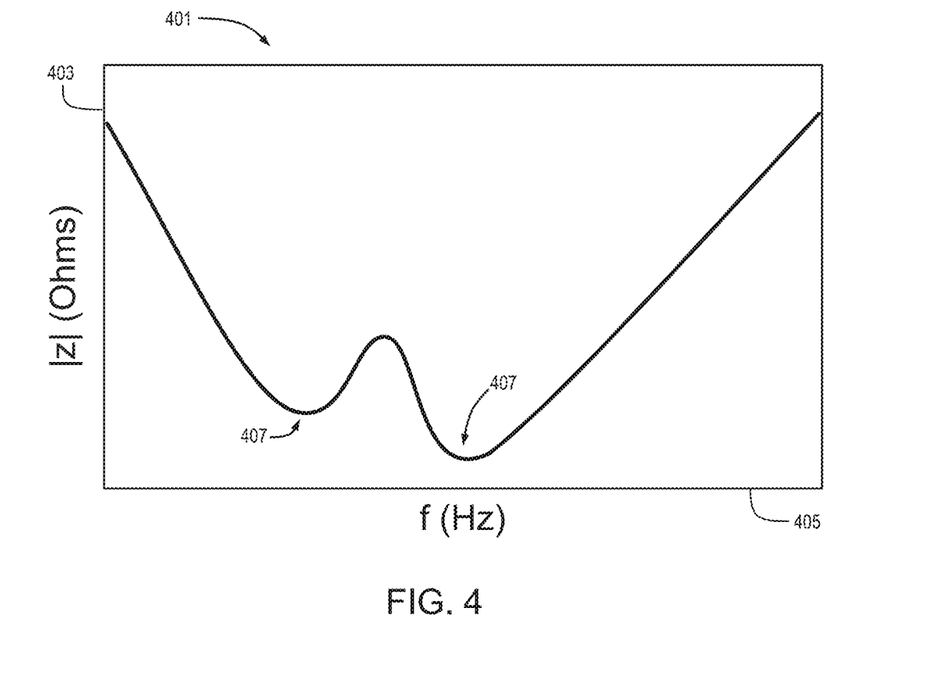
FIG. 4 illustrates a plot of impedance versus frequency, in accordance with one or more embodiments.

With reference to FIG. 4, the common mode impedance characteristics of the stator windings 203 to the motor frame 205 may be developed through an empirically derived impedance plot 401 of impedance (|z|) in Ohms versus frequency (f) in Hz. In one embodiment, impedance may be measured between the stator core 204 and the stator windings 203 as a substantial equivalent of the impedance between the motor frame 205 and stator windings 203 since the motor frame 205 and stator core may be galvanically coupled in an operative installation. Since common mode impedance implicates all phases of the stator windings 203, the phase leads at the individual phase windings may be shorted together during impedance measurements. A frequency swept voltage signal may be applied across the shorted phase leads and the stator core 204 and impedance measurements recorded. An exemplary plot of such impedance measurements versus frequency is illustrated in FIG. 4 wherein relative impedance |z| is plotted along the vertical axis 403 and relative frequency f is plotted along the horizontal axis 405. Local minimum impedances 407 may correspond to relatively high values of the winding to frame capacitance $C_{wf}$ from the stator windings 203 in the stator core 204 to the motor frame 205, and respective frequencies correspond to strong resonant behavior of the impedance network 201 of the motor 120 and correspondingly high bearing currents. Thus, these local low impedance resonant frequencies of the winding to frame capacitance $C_{wf}$ are desirably addressed by the filtering effects of the AC choke 150 applied to the AC bus 111. Therefore, the AC choke 150 may be desirably specified with a bandwidth that covers the highest resonant winding to frame impedance frequency observed. As used herein, bandwidth that covers the highest resonant winding to frame impedance frequency means an effective signal attenuation at the highest resonant winding to frame impedance frequency of at least 3 decibels (dB). Other metrics for determining choke bandwidth and performance may be apparent to those skilled in the art.

The inductance of the AC choke 150 is the mechanism by which the AC choke 150 attenuates the undesirable common mode currents and may be defined by the material (permeability vs. frequency), its saturation limit and geometry (i.e., section through the core 301, mean length of the flux path 305 through core 301). The size of the core 301 affects the saturation limit of the AC choke 150 which, when reached, drops the inductance significantly thus negatively affecting the effectiveness in suppressing the common mode currents. Core 301 materials are generally characterized by permeability vs. frequency and a design objective for the AC choke 150 may be to have sufficient permeability to avoid saturation at the highest resonant frequency observed in the impedance plot 401. Exemplary core 401 materials and construction may include ferrites or ferromagnetic powder and binders. In an embodiment, the core 301 may be constructed from wound ribbons (e.g., iron-based nanocrystalline alloy ribbons) to achieve permeability and high saturation limits over a wide frequency range. In an embodiment, the core 301 may be constructed from a stack of electrical steel laminations. In an embodiment, a ferrite core may be formed from a powder metal (sintered or molded with binder) and may be a single piece or multiple pieces. In an embodiment, the core 301 may be piecewise-constructed, for example with a pair of C-shaped halves or other arrangements of core components. The AC choke 150 design may be determined experimentally by directly measuring the bearing currents in an operable set up and through design of experiments with a range of AC choke 150 size parameters (mass, cross sectional area, effective mean length, etc.). Bearing currents may be determined through instrumented bearings that are isolated and jumpered to bypass the bearing current allowing for measurement. Operationally equivalent AC chokes 150 may be objectively evaluated relative to such decision factors as mass, packaging volume and cost. Operational equivalence may refer to bearing current reduction to some arbitrary target level, for example. Thus, an AC choke 150 may be specified for use surrounding the AC bus 111 for effectiveness as well as in consideration of design and cost parameters.

An AC choke 150 surrounding the AC bus 111 as described herein may effectively reduce the circulating currents which are displacement currents through the bearings and reduce the opportunity for harmful discharges through the bearings as EDM currents as described herein. However, while the AC choke 150 effective in such a manner to attenuate the common mode currents inducing such circulating parasitic currents, the choke may not satisfactorily reduce common mode currents at all operating conditions. For example, the high frequency switching dv/dt from the power inverter may produce such high amplitude common mode currents that simple passive attenuation from a common mode choke may prove insufficient. Thus, charge may accumulate or building up on the rotor 120R resulting in sustained voltage at the rotor shaft 125 which may reach a critical level and result in EDM currents through the bearings. Thus, very high switching frequencies and high slew rates, such as those achievable with emerging solid-state switching technologies such as silicon carbide (SIC) MOSFETs, gallium nitride (GaN) transistors, diamond MOSFETs, carbon nano-tube transistors, and graphene-based transistors, may generate common mode currents insufficiently attenuated with passive chokes alone.

Figure 5:
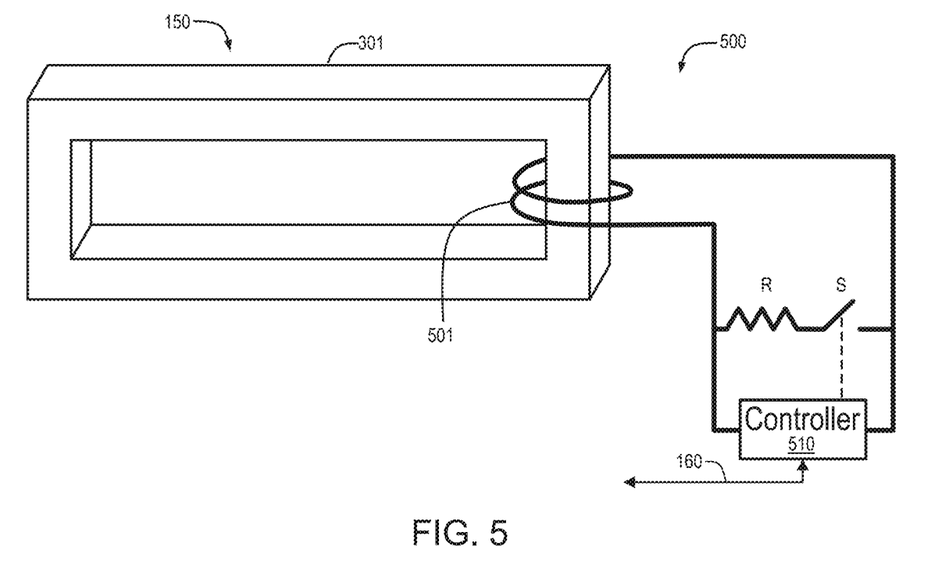
FIG. 5 illustrates a common mode current sensor, in accordance with one or more embodiments.

Thus, in an embodiment, a common mode choke may advantageously provide structure and function benefitting common mode current detection and measurement in an electrified vehicle or other non-vehicular application. FIG. 5 schematically illustrates a common mode current sensor 500 integrated with an AC choke 150 as described herein. The AC choke 150 core 301 is illustrated without the additional details of the surrounded AC bus 111 and the flux path 305 for clarity. In an embodiment, the core 301 of the AC choke 150 may include a conductive coil 501 wrapping the core 301. Advantageously, such placement may provide core concentrated flux through the coil 501. The coil 501 may include one or more secondary winding turns around the core 301 and may surround the entire core or, as illustrated a limited region of the core 301. The surrounded AC bus 111 provides an equivalent of a single primary winding turn, Np=1, providing a primary voltage equivalent to the common mode voltage, $V_{cm}$, of the AC bus 111 and a primary current equivalent to the common mode current, $I_{cm}$, through the AC bus 111. The number of secondary winding turns, Ns, may be one or more. Since there is only a single primary winding turn (i.e., AC bus), the voltage reflected across the coil 501 is a multiple of the common mode voltage of the AC bus in accordance with the turn ratio Np:Ns and a minimum of at least equivalent to the common mode voltage, $V_{cm}$, of the AC bus 111.

In an embodiment, a controller 510 may be configured to integrate the open circuit voltage, $V_s$, across the coil 501 as a proportional measure of the common mode current through the AC bus 111. When the secondary winding is open, the current in the primary winding will only be determined by the primary voltage and the impedance of the primary winding itself, as there is no current flow in the secondary winding to create a magnetic flux linking with the primary winding. The rate of change of the magnetic flux linking the secondary winding is directly proportional to the rate of change of the common mode current, $I_{cm}$, through the primary winding (i.e., AC bus). Thus, the voltage induced in the secondary winding (i.e., coil 501) is proportional to the rate of change of the common mode current, $I_{cm}$. Integrating the output of the coil 501 with respect to time effectively converts the open circuit voltage, $V_s$, to a current waveform, which can be used to determine the common mode current, $I_{cm}$. The controller 510 may therefore determine the common mode current, $I_{cm}$, as follows:

$$I_{cm} = k \int V_s dt \qquad [1]$$

wherein k is a scaling constant, weight or gain. One skilled in the art will appreciate that the controller 510 may perform the integration functions digitally using microcontroller or digital signal processing circuitry. The controller 510 may be wholly packaged with the coil 501 and provide a common mode current measurement to the motor controller 105 or other controllers via a CAN bus 160 for example. The controller 510 may include raw voltage measurement and digitization circuitry packaged with the coil 501 with integration or other post processing of the raw voltage measurements via the motor controller 105 or other controllers.

In an embodiment, the controller 510 may be configured to measure voltage, $V_r$, across a shunt resistor, R. The shunt resistor, R, may be permanently in circuit or, as illustrated, be selectively placed across the coil 501 via a controllable switch, S. The controllable switch, S, and the shunt resistor, R, may therefore allow selectively determining the common mode current, $I_{cm}$, as described herein through open circuit voltage, $V_s$, integration or through the linear relationship between voltage, $V_r$, across a shunt resistor, R, and a resistor current, $I_r$, through the shunt resistor, R, and the known turn ratio Np:Ns. The voltage, $V_r$, across the shunt resistor, R, may be measured and the current through the secondary winding (coil 501) determined as a proportional measure of common mode current, $I_{cm}$, through the AC bus 111. It is noted that the voltage, $V_r$, across the shunt resistor is much smaller than open circuit voltage, $V_s$, and may therefore be relatively easier to use in practice when compared to other embodiments. Thus, the current, $I_r$, through the shunt resistor, R, may be determined as follows:

$$I_r = \frac{V_r}{R} \quad [2]$$

And the common mode current, $I_{cm}$, derived as a function of the turn ratio Np:Ns as follows:

$$I_{cm} = I_r(Np/Ns) \quad [3]$$

One skilled in the art will appreciate that the controller 510 may perform the calculation functions digitally using microcontroller or digital signal processing circuitry. The controller 510 may be wholly packaged with the coil 501 and provide a common mode current measurement to the motor controller 105 or other controllers via a CAN bus 160 for example. The controller 510 may include raw voltage measurement and digitization circuitry packaged with the coil 501 with calculations or other post processing of the raw voltage measurements via the motor controller 105 or other controllers.

Figure 6:
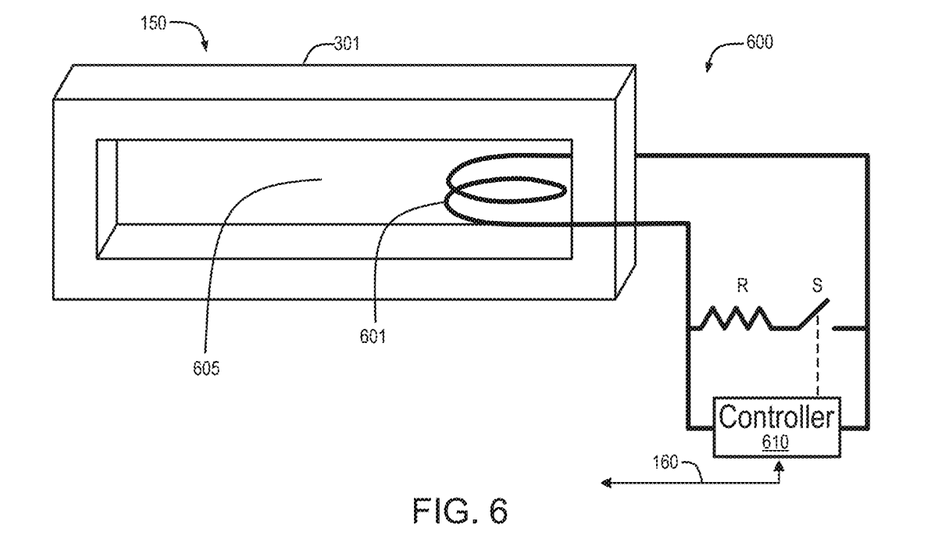
FIG. 6 illustrates a common mode current sensor, in accordance with one or more embodiments.

FIG. 6 schematically illustrates a common mode current sensor 600 integrated with an AC choke 150 as described herein. The AC choke 150 core 301 is illustrated without the additional details of the surrounded AC bus 111 and the flux path 305 for clarity. In an embodiment, the core 301 of the AC choke 150 may include a conductive coil 601 residing within the central hole 605 through which passes the AC bus 11 (FIG. 3). In such an arrangement, the coil 601 is said to be surrounded by or within the choke 150. Advantageously, such placement may isolate the coil 601 from external fields. The coil 601 may include one or more secondary winding turns within the hole 605 of the core 301 and may surround the entire AC bus 111, only partially surround the AC bus 111 or be adjacent thereto. The surrounded AC bus 111 provides an equivalent of a single primary winding turn, Np=1, providing a primary voltage equivalent to the common mode voltage, $V_{cm}$, of the AC bus 111 and a primary current equivalent to the common mode current, $I_{cm}$, through the AC bus 111. The number of secondary winding turns, Ns, may be one or more. Since there is only a single primary winding turn (i.e., AC bus), the voltage reflected across the coil 601 is a multiple of the common mode voltage of the AC bus in accordance with the turn ratio Np:Ns and a minimum of at least equivalent to the common mode voltage, $V_{cm}$, of the AC bus 111 substantially as described herein with respect to the coil 501 wrapping the core 301. However, in the embodiment of FIG. 6 it is appreciated that the coil 601 is air cored. To retain its shape and for mounting structure, the coil 601 may be wrapped upon a nonmagnetic spool. Advantageously, a coreless coil 601 surrounded by the core 301 of the AC choke 150 may be shielded from electromagnetic excitations external to the AC choke 150. Moreover, the coreless coil 601 cannot saturate, thus retaining its response characteristics through all operating conditions and allowing for flexibility in establishing a higher number of turns Ns if desired since flux concentration is not a factor.

In an embodiment, a controller 610 may be configured in substantially the same manners as described with respect to the embodiments of FIG. 5. That is, the measurement circuit may perform integration of an open circuit voltage, $V_s$, across the coil 601 as a proportional measure of the common mode current through the AC bus 111, or may be configured to measure voltage, $V_r$, across a shunt resistor, R, which may be permanently in circuit or, as illustrated, be selectively placed across the coil 601 via a controllable switch, S. As in the embodiments described herein with respect to FIG. 5, one skilled in the art will appreciate that the controller 610 may perform the calculation functions digitally using microcontroller or digital signal processing circuitry. The controller 610 may be wholly packaged with the coil 601 and provide a common mode current measurement to the motor controller 105 or other controllers via a CAN bus 160 for example. The controller 510 may include raw voltage measurement and digitization circuitry packaged with the coil 501 with calculations or other post processing of the raw voltage measurements via the motor controller 105 or other controllers.

In each of the embodiments of FIGS. 5 and 6, coils 501 and 601 that are either arranged within in a core 301 (i.e., circumscribed or surrounded by the core) or wound on a core 301 are considered to be proximate the core.

Figure 7:
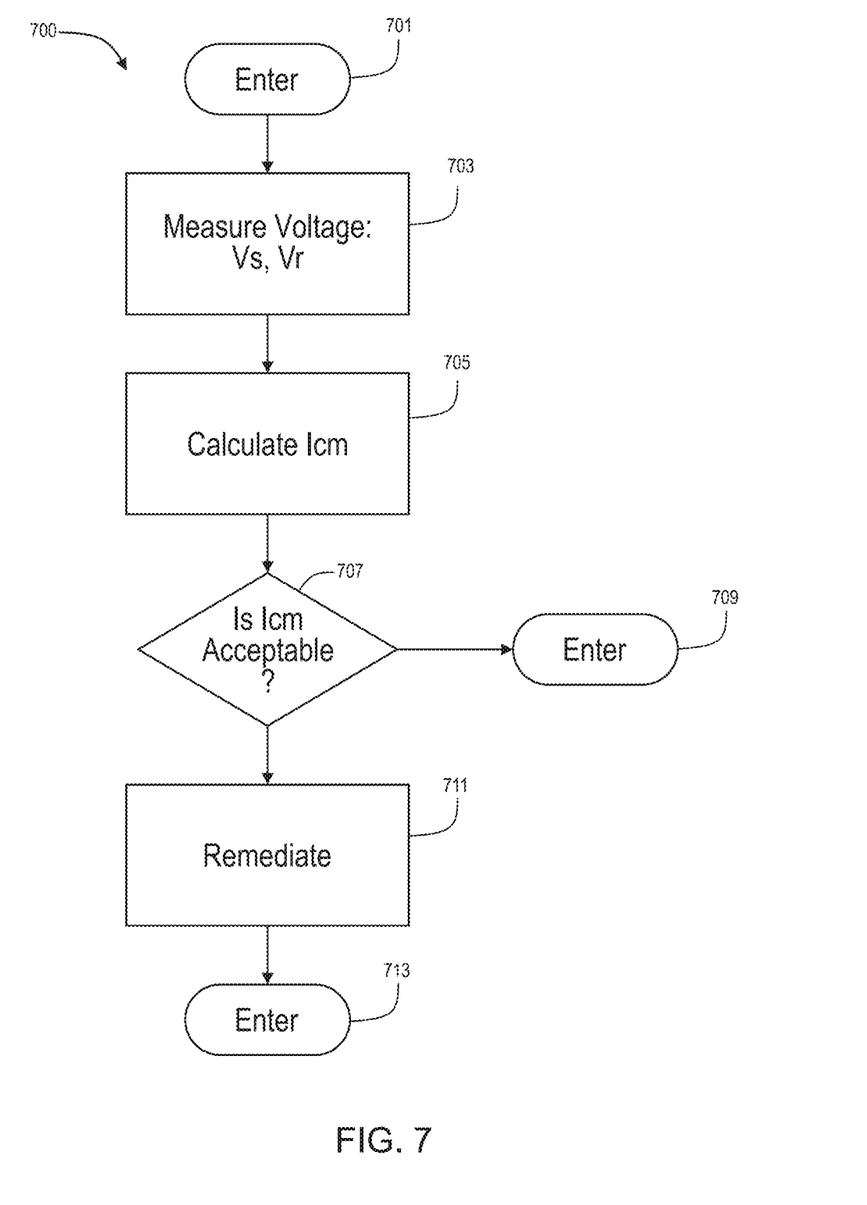
FIG. 7 illustrates a common mode current control method, in accordance with one or more embodiments.

FIG. 7 is a process flow 700 illustrating an exemplary implementation of common mode current control method in accordance with the present disclosure. During ongoing vehicle operation, the process flow 700 may be repetitively executed as part of an overall vehicle 100 control. The process flow 700 may represent routines and functions executed or performed, at least in part, by a processor or processors disposed in the vehicle 100 of FIG. 1, including within one or more of the various controllers (e.g., 103, 105, 114, 510, 610) and acting on or in conjunction with the various tangible hardware and devices including the electric propulsion system 101 described herein. The routines may represent instruction sets stored in non-transitory memory and executed by the processor of one or more controllers. The routines and functions of process flow 700 are illustrated with individual tasks and groups of tasks in a substantially linear fashion. One skilled in the art will understand that the process flow 700 described may be represented in alternative ways including state flow diagrams and activity diagrams, for example. One skilled in the art also understands that the various tasks in the process flow 700 may be implemented in different orders and/or simultaneously, and consolidated or split. The process flow 700 is discussed in conjunction with the electric propulsion system 101 of the exemplary vehicle 100 of FIG. 1 and the exemplary common mode current sensors of FIGS. 5 and 6 for illustration purposes. It is noted that aspects of the process flow 700 may be performed by any suitable processing device or system, and various aspects may be implemented in whole or in part by various integrated or distributed circuits and controllers.

The method begins at 701 and proceeds to 703 whereat voltage measurements of may be taken. Voltage measurement tasks may include periodic data acquisition, including filtering and synchronization, on schedule or periodically as required or called by control routines of the electric propulsion system 101. Voltage measurement tasks may include voltage measurements across a coil (501/601 of FIG. 5/FIG. 6) as described in detail herein. Voltage measurement tasks may include measurements of open circuit voltages, $V_s$, across the coils 501, 503 and/or measurements of voltage, $V_r$, across a shunt resistor, R associated with coils 501, 503.

At 705, the common mode current, $I_{cm}$, is calculated based upon the voltage measurements from 703 and other known, measured, sensed, estimated, or otherwise provided parameters. For example, calibration constants such as gain k (EQ. [1]), shunt resistance R (EQ. [2]) and turn ratio Np:Ns (EQ. [3]) may be retrieved from memory for use in performing direct and intermediate calculations to determine the common mode current, $I_{cm}$.

At 707, a diagnostic check is performed relative to the determined common mode current, $I_{cm}$. Acceptability of common mode current, $I_{cm}$, may be determined with respect to a number of metrics including simple threshold deviations, counts, and time based metrics among others. If the common mode current, $I_{cm}$, is deemed acceptable, then the present run of the process flow 700 may be exited at 709. However, if the common mode current, $I_{cm}$, is deemed unacceptable, then remediation tasks may be invoked at 711.

At 711, corrective measures may be implemented to address the unacceptable common mode current, $I_{cm}$. Such remediation may, for example, include limitations placed on the fundamental AC frequency on the AC bus, adapting the switching parameters of the power inverter switching section including adjusting PWM or adjusting the gate drive signals. For example, the slew rate of the power switches may be adjusted to effect reductions in common mode currents by reducing high frequency excitations from rapid dv/dt and di/dt by and through the power inverter 110. In an embodiment, a slew rate control signal 126 to a slew rate control module 128 of the power inverter 110 for controlling the switching section of the power inverter 110 may selectively switch gate resistance between two discrete values corresponding to two discrete slew rate performances. Thus, a simple binary slew rate control signal 126 may be provided to the slew rate control module 128 capable of performing such adaptation. In an embodiment, a slew rate control signal 126 to a slew rate control module 128 of the power inverter 110 for controlling the switching section of the power inverter 110 may set gate resistance more granularly than merely two discrete value, thus providing for more precise slew rate adjustments. In an embodiment where slew rate control may not be available or desirable, adaptive (APWM) and variable frequency (VFPWM) PWM variants and others may be employed to generate switching vector signals ($S_{abc}$) 109. For example, with APWM, the duty cycle of the switching waveform may be adjusted in real-time with adjustment being made using a feedback loop that compares the actual output voltage with a reference voltage and adjusts the duty cycle accordingly. To achieve slew rate control with APWM, the feedback loop may be modified to include a slew rate limiter. The slew rate limiter monitors the rate of change of the output voltage and limits it to a predetermined value by adjusting the duty cycle of the switching waveform. With VFPWM, the switching frequency may be varied in real-time to control the output voltage. To achieve slew rate control, the frequency may be varied gradually during the switching transition to control the rate of change of the output voltage. These gate drive and PWM techniques are merely exemplary, it being understood that alternative strategies may be possible effective to remediate the unacceptable common mode current, $I_{cm}$, situation.

Subsequent to remediation tasks at 711, the present run of the process flow 700 may be exited at 713.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

When an element such as a layer, film, region, or substrate is referred to as being "on" another element, it can be directly on the other element or intervening elements may also be present. In contrast, when an element is referred to as being "directly on" another element, there are no intervening elements present. Therefore, unless explicitly described as being "direct," when a relationship between first and second elements is described in the above disclosure, that relationship may be a direct relationship where no other intervening elements are present between the first and second elements but may also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements.

Unless defined otherwise, technical and scientific terms used herein have the same meaning as is commonly understood by one of skill in the art to which this disclosure belongs.

Unless specified to the contrary herein, all test standards are the most recent standard in effect as of the filing date of this application, or, if priority is claimed, the filing date of the earliest priority application in which the test standard appears.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An alternating current (AC) motor system, comprising:
an AC motor including a rotor and a stator having multi-phase AC stator windings;
a power inverter producing a multi-phase AC voltage;
an AC bus coupled between the power inverter and the multi-phase AC stator windings;
an AC choke surrounding the AC bus; and
a current sensor including a coil proximate the AC choke.

2. The AC motor system of claim 1, wherein the coil proximate the AC choke is wound around the AC choke.

3. The AC motor system of claim 1, wherein the coil proximate the AC choke is within the AC choke.

4. The AC motor system of claim 2, wherein the current sensor comprises a shunt resistor across the coil to provide a measurable voltage across the shunt resistor used in determining a current through the shunt resistor.

5. The AC motor system of claim 2, wherein the current sensor comprises a voltage integrator used to integrate an open circuit voltage across the coil.

6. The AC motor system of claim 2, wherein the current sensor comprises a shunt resistor selectively couplable across the coil to provide a measurable voltage across the shunt resistor when coupled across the coil and otherwise to provide a measurable open circuit voltage across the coil when not coupled across the coil.

7. The AC motor system of claim 3, wherein the current sensor comprises a shunt resistor across the coil to provide a measurable voltage across the shunt resistor used in determining a current through the shunt resistor.

8. The AC motor system of claim 3, wherein the current sensor comprises a voltage integrator used to integrate an open circuit voltage across the coil.

9. The AC motor system of claim 3, wherein the current sensor comprises a shunt resistor selectively couplable across the coil to provide a measurable voltage across the shunt resistor when coupled across the coil and otherwise to provide a measurable open circuit voltage across the coil when not coupled across the coil.

10. The AC motor system of claim 1, wherein the coil comprises a single turn.

11. The AC motor system of claim 1, wherein the AC choke has an effective bandwidth at least covering resonant frequencies of a capacitance between the AC stator windings and the stator or a frame of the AC motor.

12. A method of controlling an alternating current (AC) motor system, comprising:
attenuating a common mode current through an AC bus with an AC choke surrounding the AC bus, the AC bus providing multi-phase AC current from a power inverter to multi-phase AC stator windings in a stator;
determining the common mode current based upon a voltage from a coil proximate the AC choke; and
adjusting one of a slew rate and a pulse width modulation of the power inverter based upon the determined common mode current.

13. The method of controlling the AC motor system of claim 12, wherein the coil is wound around the AC choke.

14. The method of controlling the AC motor system of claim 12, wherein the coil is within the AC choke.

15. The method of controlling the AC motor system of claim 12, wherein the AC choke comprises an effective bandwidth at least covering resonant frequencies of a capacitance between the multi-phase AC stator windings and the stator or a frame of the AC motor.

16. An electrified powertrain, comprising:
a battery pack;
a traction power inverter module ("TPIM") connected to the battery pack, and configured to change a direct current ("DC") voltage from the battery pack to a multi-phase alternating current ("AC") voltage;
a rotary electric machine energized by the multi-phase AC voltage from the TPIM over a multi-phase AC bus, and comprising:
a stator having multi-phase AC stator windings;
a rotor; and
a rotor shaft connected to and surrounded by the rotor, and configured to rotate about an axis of rotation in conjunction with the rotor when the rotary electric machine is energized;
a transmission coupled to the rotor shaft and powered by the rotary electric machine;
an AC choke surrounding the multi-phase AC bus;
a current sensor including a coil proximate the AC choke for determining a common mode current through the AC bus; and
a controller responsive to a signal from the current sensor to adjust one of a slew rate and a pulse width modulation of the TPIM based upon the determined common mode current.

17. The electrified powertrain of claim 16, wherein the AC choke has an effective bandwidth at least covering resonant frequencies of a capacitance between the multi-phase AC stator windings and the stator or a frame of the rotary electric machine.

18. The electrified powertrain of claim 16, wherein the coil proximate the AC choke is wound around the AC choke.

19. The electrified powertrain of claim 16, wherein the coil proximate the AC choke is within the AC choke.

20. The electrified powertrain of claim 16, wherein the current sensor comprises a shunt resistor selectively couplable across the coil to provide a measurable voltage across the shunt resistor when coupled across the coil and otherwise to provide a measurable open circuit voltage across the coil when not coupled across the coil.

* * * * *